(12) United States Patent
Young (10) Patent No.: US 6,758,017 B2
(45) Date of Patent: Jul. 6, 2004

(54) DRYWALL INSIDE CORNER DEVICE

(76) Inventor: Peter P. Young, 222 Harmony Hills Pkwy., Akron, OH (US) 44521

( * ) Notice: Subject to any disclaimer, the term of this patent is extended or adjusted under 35 U.S.C. 154(b) by 0 days.

(21) Appl. No.: 10/227,915

(22) Filed: Aug. 26, 2002

(65) Prior Publication Data

US 2003/0056453 A1 Mar. 27, 2003

Related U.S. Application Data

(60) Provisional application No. 60/315,263, filed on Aug. 27, 2001.

(51) Int. Cl.[7] .............................................. E04B 2/00
(52) U.S. Cl. ................................ 52/255; 52/34; 52/35; 52/254; 52/256; 52/257; 52/282.1; 52/282.4; 52/287.1; 52/288.1; 403/205; 403/231; 403/382; 403/403
(58) Field of Search ........................... 52/287.1, 288.1, 52/255, 256, 257, 282.1, 282.4, 34, 35, 254; 403/205, 231, 382, 403

(56) References Cited

U.S. PATENT DOCUMENTS

| | | | | |
|---|---|---|---|---|
| 854,654 A | * | 5/1907 | Krantz | 52/282.1 |
| 940,299 A | * | 11/1909 | Bierend | 312/140 |
| 1,129,658 A | * | 2/1915 | Foy | 249/188 |
| 1,804,564 A | * | 5/1931 | McChesney | 52/255 |
| 2,079,635 A | * | 5/1937 | Sharp | 52/241 |
| 2,379,179 A | * | 6/1945 | Petersen | 52/282.1 |
| 2,851,741 A | * | 9/1958 | Stemples | 52/255 |
| 3,201,908 A | * | 8/1965 | Arnold | 52/255 |
| 3,206,806 A | * | 9/1965 | Powell | 52/287.1 |
| 3,323,264 A | * | 6/1967 | Cross | 52/281 |
| 3,444,657 A | * | 5/1969 | Swanson | 52/287.1 |
| 3,643,393 A | | 2/1972 | Pierce et al. | |
| 3,989,397 A | * | 11/1976 | Baker | 403/205 |
| 4,065,885 A | * | 1/1978 | Blick et al. | 52/143 |
| 4,189,885 A | * | 2/1980 | Fritz | 52/287.1 |
| 4,210,274 A | * | 7/1980 | Leonard | 229/198.1 |
| 4,258,519 A | * | 3/1981 | Hugens | 52/282.1 |
| 4,315,390 A | * | 2/1982 | Schaafsma | 52/287.1 |
| 4,385,850 A | * | 5/1983 | Bobath | 403/205 |
| 4,507,815 A | * | 4/1985 | Danko | 5/400 |
| 4,509,806 A | * | 4/1985 | Dudouyt | 312/265.2 |
| 4,553,363 A | * | 11/1985 | Weinar | 52/288.1 |
| 4,598,516 A | * | 7/1986 | Groshong | 52/241 |
| 4,624,087 A | * | 11/1986 | Schneller | 52/254 |
| 4,712,942 A | * | 12/1987 | Brown | 403/174 |
| 4,719,732 A | * | 1/1988 | Bernard | 52/287.1 |
| 4,835,925 A | * | 6/1989 | Hoffmann, Sr. | 52/287.1 |
| 4,863,774 A | * | 9/1989 | Tucker | 428/77 |
| 4,982,540 A | * | 1/1991 | Thompson | 52/288.1 |
| 4,999,961 A | * | 3/1991 | McNary | 52/287.1 |
| 5,054,374 A | * | 10/1991 | Scobie et al. | 92/120 |
| 5,086,598 A | * | 2/1992 | Weldy | 52/288.1 |
| 5,101,594 A | * | 4/1992 | Ahm | 47/56 |
| 5,197,247 A | * | 3/1993 | Elderson | 52/288.1 |
| 5,203,640 A | * | 4/1993 | Pourtau et al. | 403/403 |
| 5,226,755 A | * | 7/1993 | Tweedt | 403/205 |
| 5,265,342 A | * | 11/1993 | Lang, Jr. | 30/294 |
| 5,388,288 A | * | 2/1995 | Fell, Sr. | 4/679 |
| 5,444,953 A | | 8/1995 | Koenig et al. | |
| 5,505,032 A | * | 4/1996 | Wasserman et al. | 52/287.1 |
| 5,531,050 A | * | 7/1996 | Stibolt et al. | 52/254 |

(List continued on next page.)

Primary Examiner—Carl D. Friedman
Assistant Examiner—Christy M. Green
(74) Attorney, Agent, or Firm—D. Peter Hochberg; Sean Mellino; Katherine R. Vieyra (57) ABSTRACT

A plastic corner device for installing drywall to form an inside corner. The corner device has a large corner with a smaller corner facing it to form a right parallelepiped, whose sides equal in length the thickness of the drywall panels. The corner device and/or the panels have adhesive applied to them, and the edges of the panels abut the smaller corner to form the inside corner. Adhesive is then applied to the rearward surfaces, and the assembly of the corner device and the panels is adhered to a building structure.

11 Claims, 7 Drawing Sheets

U.S. PATENT DOCUMENTS

| | | | |
|---|---|---|---|
| 5,604,001 A | * | 2/1997 | Schold ........................ 428/41.8 |
| 5,613,335 A | * | 3/1997 | Rennich et al. ................ 52/255 |
| 5,647,687 A | * | 7/1997 | Robinson et al. ............ 403/403 |
| 5,658,483 A | * | 8/1997 | Boeshart ...................... 249/191 |
| 5,778,617 A | * | 7/1998 | Free .............................. 52/255 |
| 5,881,520 A | * | 3/1999 | Blazevic ....................... 52/281 |
| 5,916,101 A | | 6/1999 | Stibolt |
| 5,960,598 A | * | 10/1999 | Tamlyn ......................... 52/254 |
| 5,974,746 A | * | 11/1999 | Mathias ........................ 52/255 |
| 6,223,486 B1 | | 5/2001 | Dunham |
| 6,256,953 B1 | * | 7/2001 | Vulin ............................ 52/281 |
| 6,341,458 B1 | * | 1/2002 | Burt ............................ 52/287.1 |
| D457,972 S | * | 5/2002 | Harel ......................... D25/121 |
| 6,418,696 B1 | * | 7/2002 | Swingle ..................... 52/749.1 |
| 6,434,848 B1 | * | 8/2002 | Gordon et al. ................. 33/528 |
| 6,460,724 B1 | * | 10/2002 | Bradford ..................... 220/642 |
| 6,519,906 B2 | * | 2/2003 | Yost et al. ..................... 52/426 |
| 6,539,680 B2 | * | 4/2003 | Kunz et al. .................... 52/256 |

* cited by examiner

DRYWALL INSIDE CORNER DEVICE

CROSS REFERENCE TO RELATED APPLICATIONS

This application claims the benefit of prior U.S. provisional patent application Serial No. 60/315,263 filed Aug. 27, 2001.

BACKGROUND OF THE INVENTION

1. Field of the Invention

The present invention relates generally to drywall and other panel installation. More particularly, the present invention relates to a device for forming inside corners from drywall and other panels, and to preparing inside corners from drywall and other panels.

2. Description of the Prior Art

The installation of drywall is an essential element in the fabrication of many structures, such as houses or buildings. The conventional process for drywall installation employs two separate panels of drywall which are abutted together in the requisite corner. In order to form the required smooth surface, joint tape is creased and applied to the inside corner and kept in place with joint compound. Once the joint compound has dried, generally within 24 hours, the joint compound must be sanded. This process of joint compound application and subsequent sanding is generally repeated at least twice. The result is that the conventional process for drywall application is quite tedious, repetitive and time consuming.

U.S. Pat. No. 6,223,486 (Dunham) describes a corner trim strip having a pair of metal or plastic strips and a flexible bead running along the gap between the strips. A paper layer is attached to the strips with adhesive with the bead forming an outer rib. The strips can be configured to engage a corner. The patent describes a type of joint tape.

U.S. Pat. No. 5,916,101 (Gibolt) and U.S. Pat. No. 5,459,969 (Stibolt) relate to a finishing device for forming a corner between two panels of drywall. The device has two wings which are connected to a flexible joint which forms a corner. Drywall sheets fit into the outer ends of the device.

U.S. Pat. No. 5,444,953 (Koenig et al.) describes an interior corner joint for joining wallboard panels primarily for wall or tile boards in bathrooms or kitchens. The joint has channels for receiving the edges of wallboards and has a rib which forms part of the corner.

U.S. Pat. No. 3,643,393 (Pierce et al.) describes the assembly of wallboards to form a corner and placing sheets of polyvinyl chloride over the corner which are secured by pressure-sensitive adhesive.

As is evident from the aforementioned prior art, there is an unsatisfied need to have a more efficient and less tedious process for the installation of drywall.

SUMMARY OF THE INVENTION

The present invention is a device and method that allows both contractors and lay individuals to quickly and effectively install drywall and other panels in inside corners of structures, and to prepare inside corners from drywall and other panels. The device is a corner device having a generally "L" corner incorporating a smaller cubical parallelepiped, including the portion of the legs of the "L" where the legs intersect. In other words, there is a large corner having relatively wide walls connected transversely at a juncture (i.e., to form a corner), and a smaller corner joined to and facing the larger corner. A cross section of the device reveals a cube with outwardly extending walls. The method employs using the corner device by applying adhesive to its surfaces and/or the surfaces of the panels being attached thereto and pressing them together. Adhesive is also applied to the rearward surface of the corner device and the attached panels and/or to the structure to which the panels-corner device is to be attached, and pressing them together.

It is an object of the present invention to provide a device and a method for making inside corners from drywall and other panels without the use of nails, and without the use of joint tape, joint compound, and the requirement of sanding the compound.

It is yet another object of the present invention to provide a device and a method for installing drywall that is more efficient than conventional processes.

It is still yet another object of the present invention to provide a device and a method for forming inside corners from drywall and other panels that provides a product having no paint discoloration.

A further object is to avoid the necessity for scaffolding for cathedral ceilings.

It is another object of the present invention to provide a device and a method for forming inside corners from drywall and other panels that provides a product having no paint differentiation.

It is still another object to avoid such problems as cracking of corners and popping of nails due to such movements as truss uplifting.

It is yet another object of the present invention to provide a device and a method for forming inside corners from drywall that provides a product having a smooth surface on a consistent basis.

It is a general object to provide a device and a method for using the device for forming inside corners from drywall and other panels in a fast, efficient and inexpensive manner.

BRIEF DESCRIPTION OF THE DRAWINGS

The figures display a corner device according to the invention forming an inside corner from drywall panels. The figures display the process from the initial scoring steps to the final installed product.

DESCRIPTION OF THE PREFERRED EMBODIMENT

Figure 1:
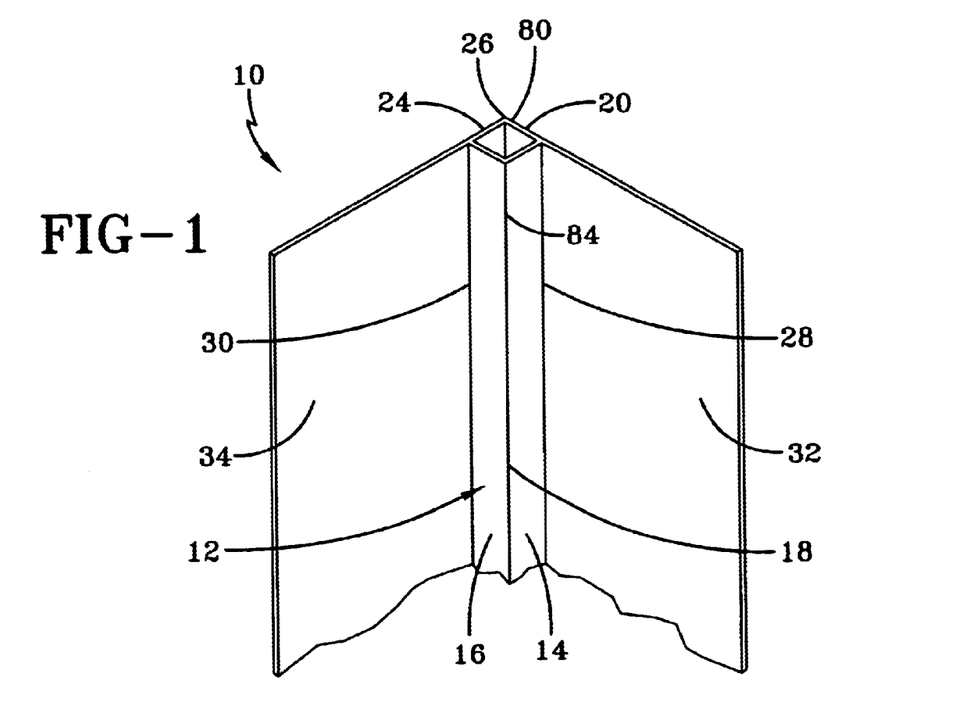
FIG. 1 is a perspective view of a corner device according to the invention.

The present invention relates to corner device, preferably made from plastic in an extrusion mold, that enables construction contractors and non-professional people to easily and quickly form inside corners from drywalls and other panels using adhesives, such as adhesive spray such as Trim-Tex® Adhesive made by Trim-Tex, Inc., and Grabber® Adhesive distributed by Grabber Construction Products, and Liquid Nails® produced by The Glidden Company. FIG. 1 shows a corner device 10 according to the invention. Corner device 10 incorporates a corner piece 12 having two outside sides 14 and 16 that meet at an intersection 18 at a right angle. Corner piece 12 has two inside sides 20 and 24 that meet at an intersection 26 that is also at a right angle. Sidewalls 14, 20, 16 and 24 also meet at right angles at the intersections 28 and 30. Walls 20 and 24 extend outwardly to form larger sidewalls, referred to herein as wings or outwardly extending exterior sides 32 and 34. The plastic is preferably a hard but somewhat resilient plastic such as appropriate polyethylene. Corner device 10 is preferably an integral unit, and can be made using conventional methods such as an appropriate extrusion system with the necessary dies.

Figure 2:
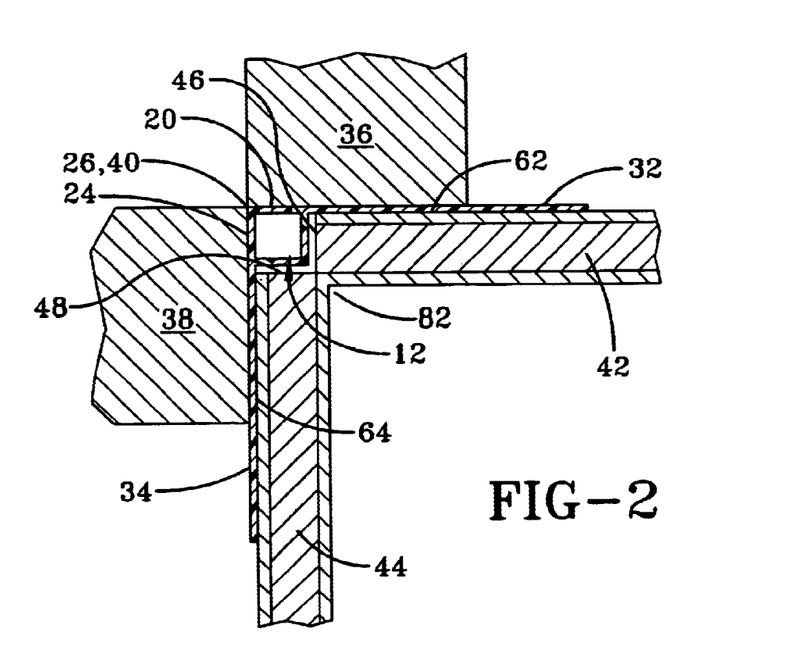
FIG. 2 is a cross-sectional top view of the corner device with drywall panels attached to a building structure and forming an inside corner.

Corner device 10 can accurately be described as having a large first corner made of a pair of relatively wide walls 32, 34 connected at a juncture 26 at right angles, and facing in one direction. A second smaller corner is composed of relatively narrow walls 14, 16 connected to each other at a juncture 18 at right angles, and facing the first corner. The sides 14, 16, 20, 24 form a cubicle parallelepiped. The walls 32, 34 extending from walls 20, 24 are outwardly extending exterior sides. That is, corner 10 in its installed condition is shown in FIG. 2. It is attached to two supporting structures for a building, such as studs 36 and 38, which form an inside corner 40. Studs 36, 38 can be of conventional dimensions such as a "2 by 4," whose dimensions are 1.50 inches by 3.50 inches. (The invention is usable with studs of other dimensions and materials, such as metal.) Corner 20 abuts the adjoining surfaces of studs 36 and 38. Intersection 26 runs along the intersection of studs 36 and 38, with side 20 of corner piece 12 engaging stud 36 and side 24 engaging stud 38. Wings 32 and 34 extend parallel to sides 20 and 24 along studs 36 and 38. Two drywall pieces 42 and 44, which as shown herein are parts of a single panel, have their respective end portions 46 and 48 abutting sides 14 and 16 of corner 12. (Even though "abutting" is used, they may be separated by a coating of adhesive.) Studs 42 and 44 meet at right angles to each other, and their intersection corresponds to intersection 18 of corner 12. Thus, drywall panels 42 and 44 meet at an inside corner without the use of joint tape, joint compound and the necessary sanding of the joint compound as was done in the prior art.

Figure 3:
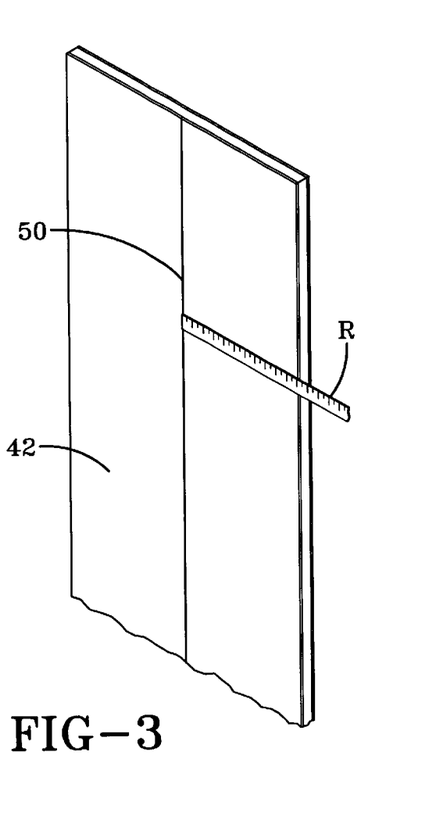
FIG. 3 is a front perspective view of a panel and ruler demonstrating a measuring step as part of the invention.
Figure 4:
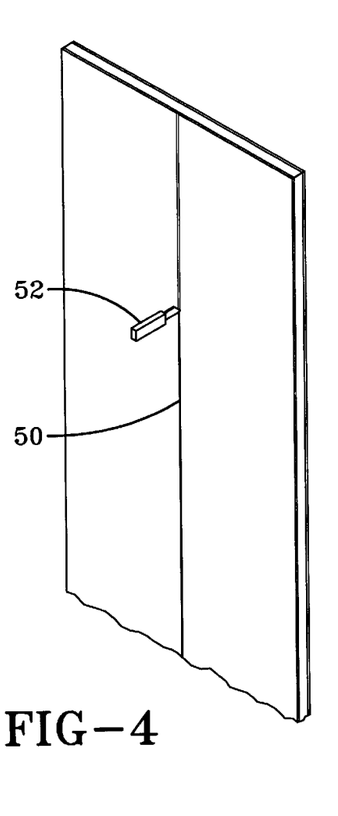
FIG. 4 is a front perspective view of a drywall panel undergoing a scoring step as part of the inventive procedure.
Figure 5:
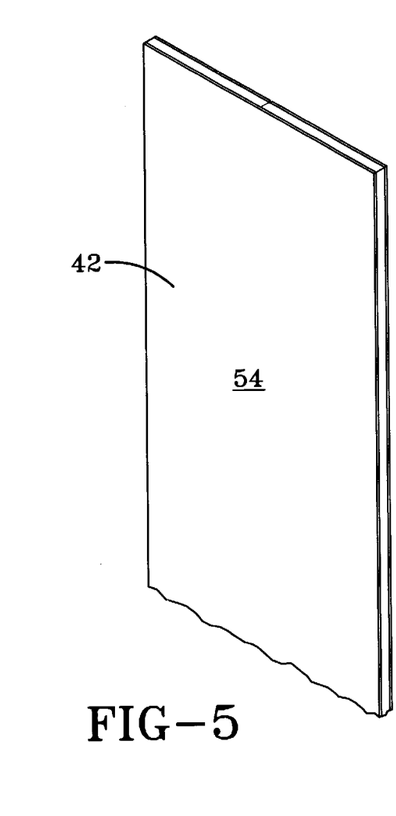
FIG. 5 is a back view of a conventional drywall having the paper left intact.

Installation of inside corner 10 involves the scoring of the drywall. Assuming that the thickness of the drywall is 0.50 inch, and that inside corner 10 has the length of each of its corner sides 14, 16 and 20, 24 of 0.3316 inch (which would equal 0.50 inch with an adhesive coating), and the length of wings 33, 34 of 2.00 inches, drywall panel 42 (or 44) would, for example, be scored lengthwise at 15½ inches from either side as shown in FIG. 3. A ruler R could be used for measuring a score line 50. FIG. 4 shows an individual with a marking device 52 marking the full length of score line 50. As shown in FIG. 5, however, the paper 54 on the other side of drywall 42 is left intact.

Figures 6, 7:
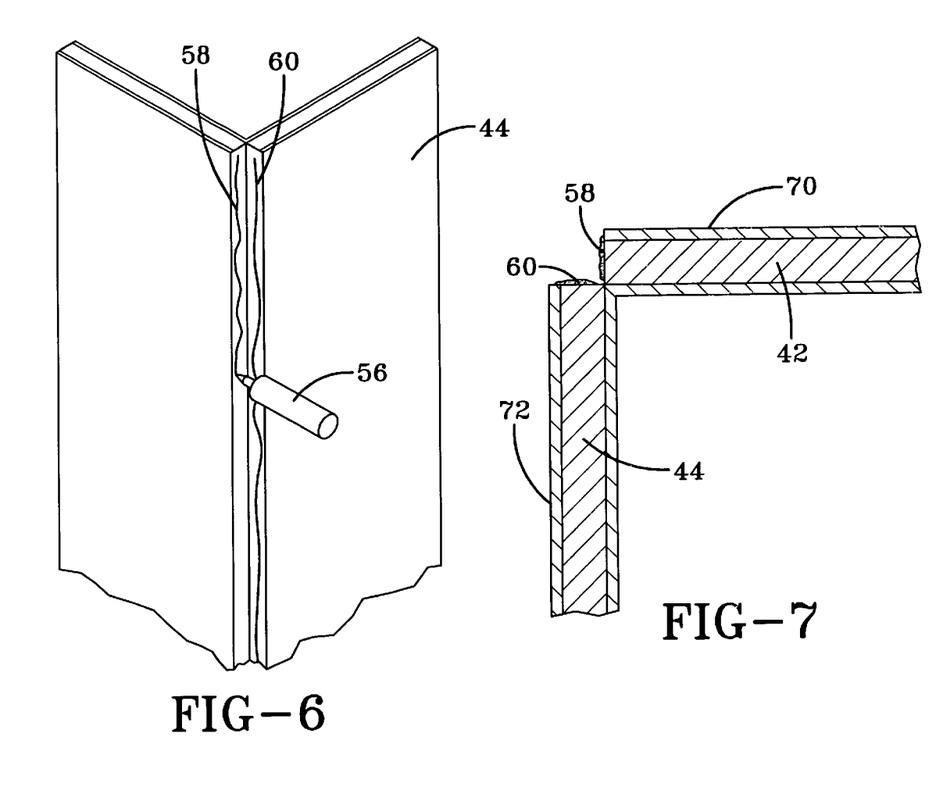
FIG. 6 is a front perspective view of adhesive being applied to edges of drywall panels.
FIG. 7 is a top, cross-sectional view of a drywall panel having adhesive applied thereto.

Drywall 42 is then broken in two along score line 50 to result in a 90° bend. The two parts of the broken drywall are indicated by numbers 42 and 44 as used in FIG. 2. An adhesive, such as Liquid Nails®, is then applied to both surfaces at the 90° inside bend of the drywall as shown in FIG. 6. The adhesive can be ejected from a conventional container 56. The adhesive is shown at the ends of drywall panels 42 and 44 by numbers 58 and 60. This is shown in FIGS. 6 and 7.

Figure 8:
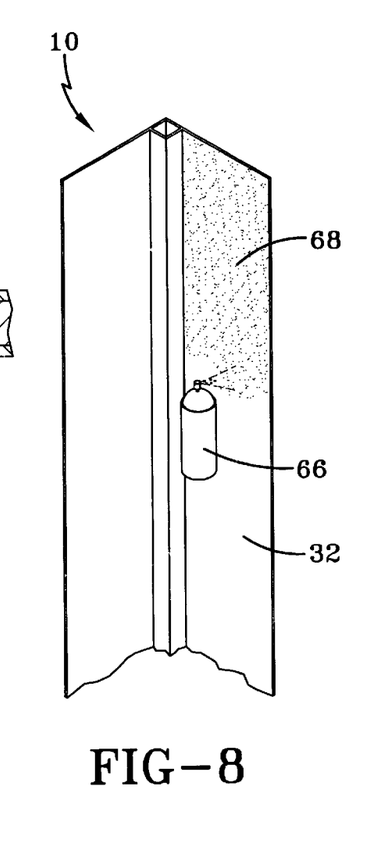
FIG. 8 is a front perspective view of a corner device having an adhesive applied thereto.

After the adhesive is applied as shown in FIGS. 6 and 7, adhesive, such as a spray adhesive, is applied to the inside surfaces of inside corner 10, as shown by numerals 62 and 64 in FIG. 2. That is, the adhesive is sprayed or otherwise applied to the inside surfaces of corner side 20 and wing 62 and corner side 24 and wing 34. The spraying of inside corner 10 is shown in FIG. 8, where a worker is spraying adhesive from a spray can 66 onto inside corner 10, the adhesive appearing as material 68. The adhesive is also applied, such as by spraying, on the inside surfaces of drywall panels 42, 44 as shown by numerals 70 and 72 in FIG. 7.

Figure 9:
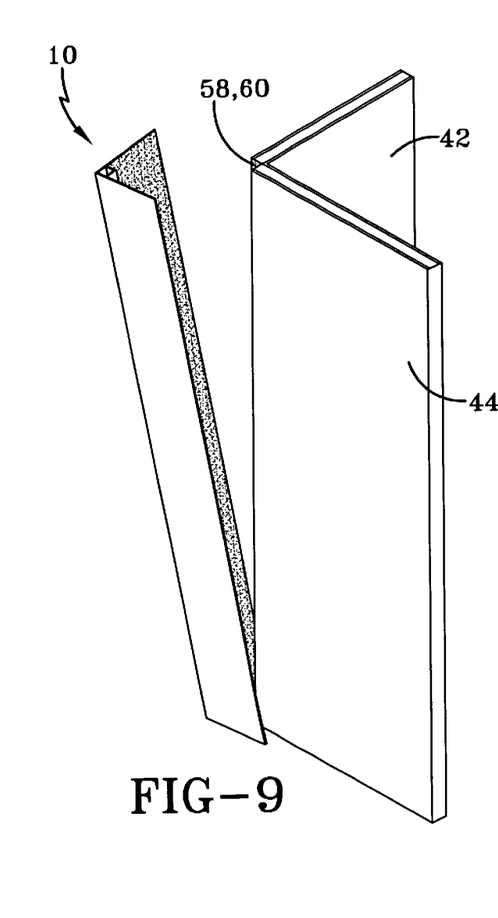
FIGS. 9 and 10 are front perspective views of drywall panels with a corner device according to the device being applied.
Figure 10:
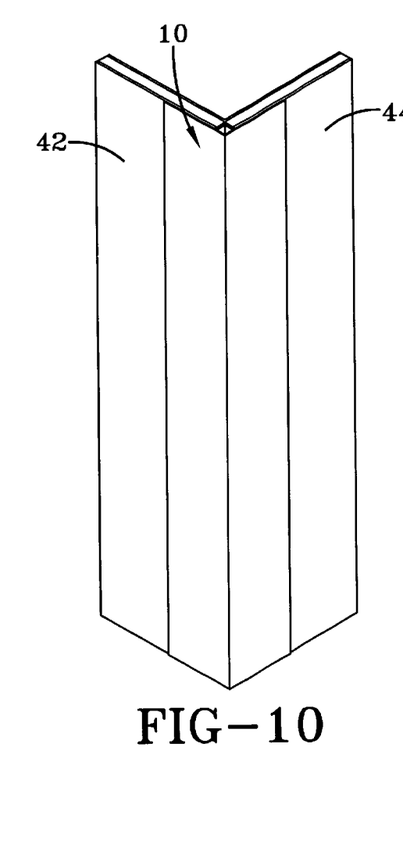

After the adhesive, such as Liquid Nails®, is applied as shown in FIG. 6, and the adhesive is applied as shown in FIG. 8 and with respect to the rear surfaces of the drywall as shown in FIG. 7 at numerals 70 and 72, inside corner 10 is adhered to drywall panels using slight pressure of the palm of the hand as shown in FIGS. 9 and 10. Referring to FIG. 9, panel 42, inside corner 10, is in the process of being adhered to the inside corner of panels 42 and 44, where the adhesive, such as Liquid Nails®, 58, 60 can be seen. Referring to FIG. 10, drywall panels 42 and 44 are shown adhered to inside corner 10, with the rear side or exterior corner being visible in FIG. 10. This is shown in FIG. 11 where drywall panels 42 and 44 are held by the adhesive, such as Liquid Nails®, 46, 48 on tube 12.

Figure 11:
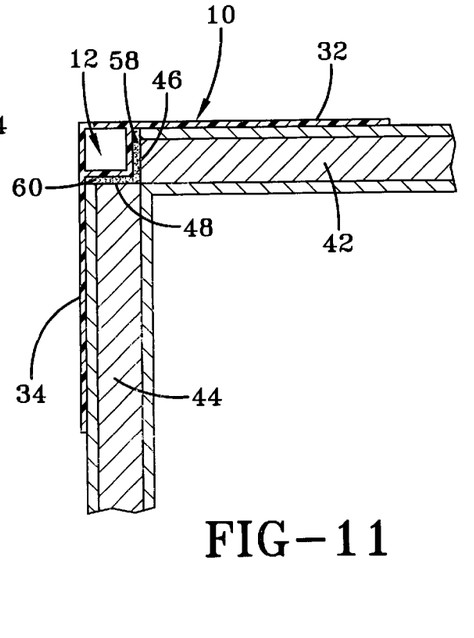
FIG. 11 is a top cross-sectional view of drywall panels being held in place by a corner device according to the invention.
Figure 12:
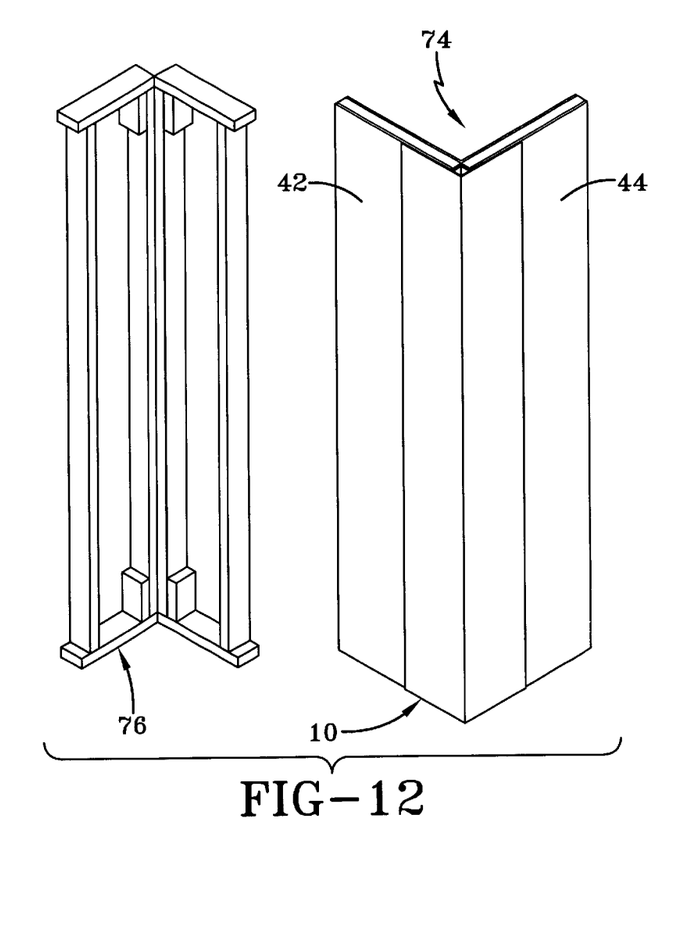
FIG. 12 is a rear perspective view of a drywall assembly about to be attached to studs of a building.
Figure 13:
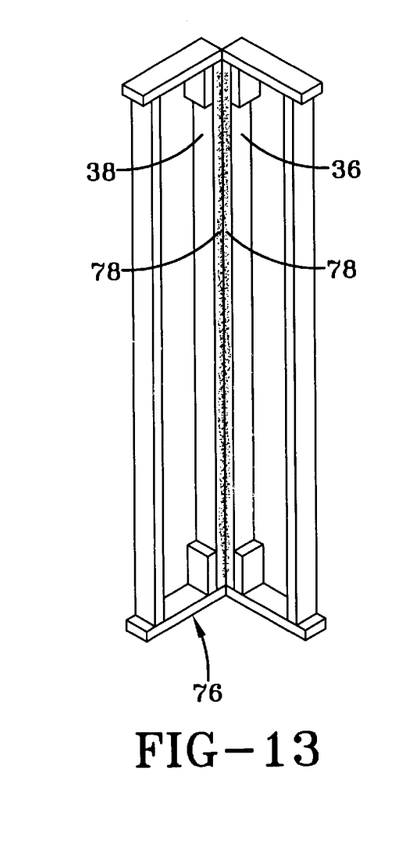
FIG. 13 is a front view of a common inside corner studded wall.
Figure 14:
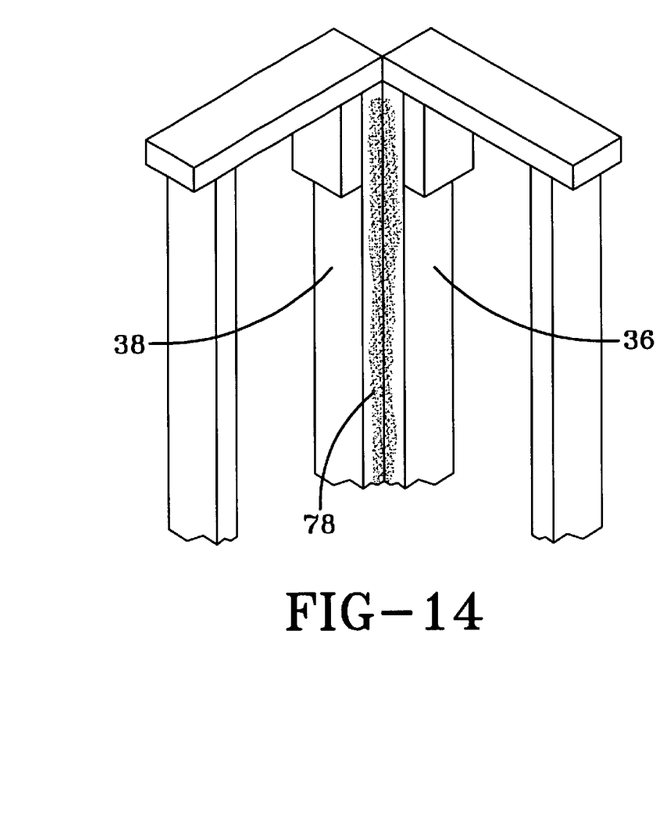
FIG. 14 is an enlarged view of a portion of the view shown in FIG. 13 showing applied adhesive.
Figure 15:
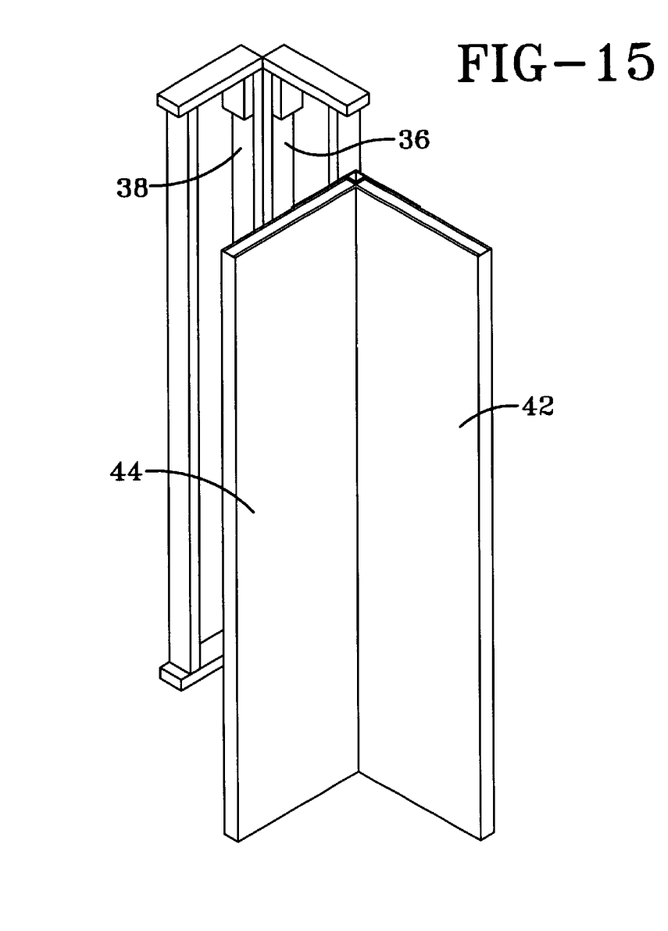
FIG. 15 is a side view of the drywall assembly being attached to the inside corner stud structure.

Referring to FIG. 11, drywall panels 42 and 44 are attached to inside corner 10 as shown in FIG. 12. This assembly is identified by the numeral 74 and is about to be attached to a structure 76 which would be part of a building structure. The worker would then apply the adhesive, such a Liquid Nails®, to the inside surfaces of studs 36 and 38 as shown in FIG. 13, where the adhesive is identified by numeral 78. This is shown in further detail in FIG. 14. The remaining drywall panels are attached in the conventional manner using screws or nails.

Finally, the assembly 74 is then pressed into the inside corners of studs 36 and 38 with inside corner 10 being seated at the intersection of the studs. Simple palm pressure is sufficient.

Thus, the drywall panels are assembled to the inside corners of the studs without any need for joint tape, joint compound or the sanding of the joint compound. The entire operation can be started and completed within minutes as opposed to the present procedure that takes over 24 hours. The system is inexpensive and the process does not require any particular skill to perform.

Figure 16:
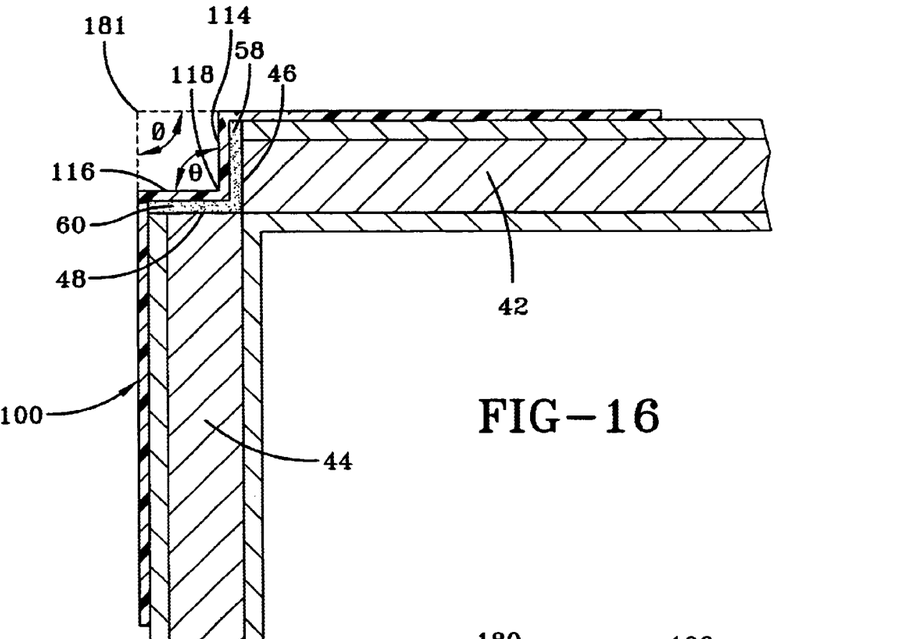
FIG. 16 is a cross-sectional view of a second embodiment of the invention.
Figure 17:
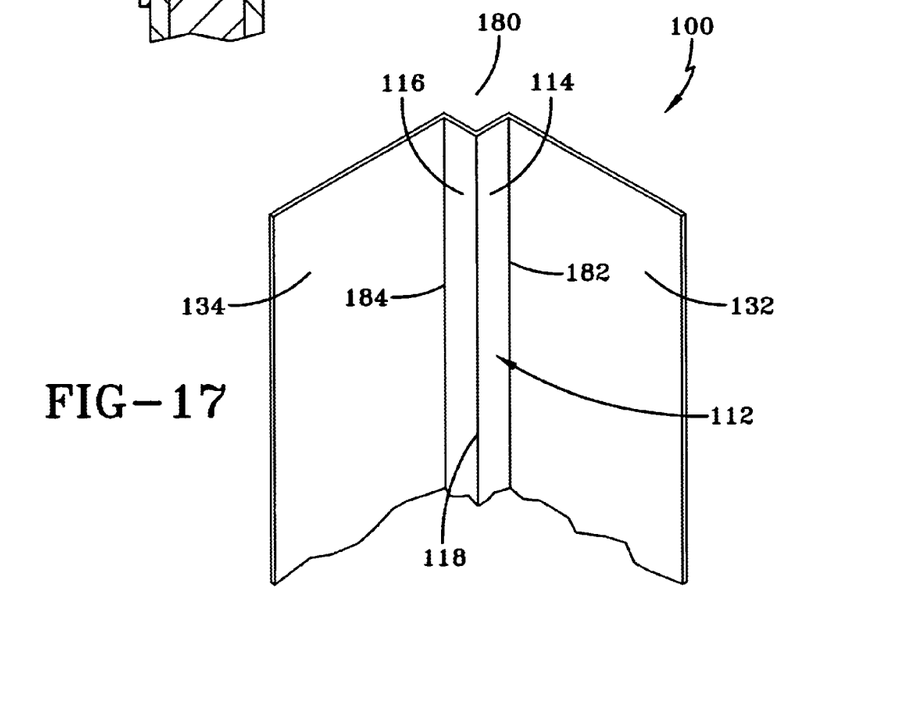
FIG. 17 is a perspective view of the second embodiment.

A second embodiment may in some cases be sufficient, as shown in FIGS. 16 and 17. A corner device 100 is similar to corner device 10, but lacks walls 20 and 24. Thus, it includes a small right angle portion 112 having walls 114 and 116 meeting at an intersection 118, with wider walls 132 and 134. Panels 42 and 44 are attached as shown in FIG. 17, on adhesive 46, 48.

Although the embodiment described above relates to inside corners which meet at 90° and are perpendicular to the ground, other variations also apply. For example, other angles may be appropriate, such as 60°, etc. Moreover, the inside corners formed by the drywall and other panels need not be perpendicular to the ground. They could be used in ceilings (such as the cathedral ceilings referred to earlier) and other regular configurations. With respect to cathedral ceilings, no scaffolding is required for the installation of joint tape and joint compound, and the sanding of the joint compound. The present invention avoids the problems caused in conventional construction processes relating to hard to reach corners.

Since there is no joint compound, there will not be any paint differentiation since the surfaces on which the paint is applied would all be the same, and there would be no fading or bleeding. No problems would occur from cracks in joint compound or the popping of nails, since truss uplifting and shrinkage would not occur with the present invention.

The invention has been described in detail, with particular emphasis on the preferred embodiment thereof, but variations and modifications may occur to those skilled in the art to which the invention pertains from the foregoing discussion and the appended claims.

What is claimed is:

1. A corner device for connecting a pair of drywall panels having a predetermined thickness at an inside corner of a building structure to form a drywall inside corner, said corner device comprising:
   a first large corner composed of a pair of relatively wide walls connected at a juncture at right angles to each other and facing in one direction, said first large corner forming an inside corner corresponding to the inside corner of said building structure;
   a second small corner composed of a pair of relatively narrow walls connected to each other at a juncture at right angles to each other and facing said first large corner in a direction opposite the one direction of said first large corner;
   said second small corner joined to a portion of said first large corner to form a cubicle parallelepiped with outwardly extending exterior sides, said parallelepiped having a predetermined width equal to the thickness of the drywall and including said inside corner of said first large corner; excess portions of said relatively wide walls of said first large corner extending beyond said cubicle parallelepiped;
   a pair of drywall panels being seatable on said excess portions of said first large corner with the respective edges of the drywall panels engaging said relatively narrow walls of said second small corner to form a drywall inside corner.

2. A corner device according to claim 1 wherein the thickness of the drywall panel is 0.5 inch, and the predetermined width of said cubicle parallelepiped is 0.5 inch.

3. A corner device according to claim 1 wherein said exterior sides of said cubicle parallelepiped are receptive to adhesive for adhering the edges of the drywall panel to said exterior sides.

4. A corner device according to claim 1 wherein said pair of relatively wide walls of said first large corner has a pair of rearwardly facing sides for engaging surfaces of the building structure, said rearwardly facing sides being receptive to adhesive for adhering said corner device to the structure.

5. A corner device according to claim 1 wherein said pair of relatively wide sides of said first large corner extending beyond said cubicle parallelepiped have forwardly facing sides receptive to adhesive to adhere the drywall panels to the corner device.

6. A corner device according to claim 1 wherein said device is made from a hard plastic.

7. A corner device according to claim 6 wherein said plastic is polyethylene.

8. A corner device according to claim 1 wherein said first large corner and said second small corner are an integral unit.

9. A corner device for connecting a pair of panels to form an inside corner for attachment to supporting pieces defining the support for the inside corner, the inside corner having the panels meeting at a linear junction, said corner device comprising:
   a corner composed of first and second walls intersecting transversely at a linear intersection, said corner being placeable to the place where the inside corner is to be formed with said linear intersection being parallel to and spaced from the juncture of the inside corner, the edges of the pair of panels engaging said first and second walls to form the inside corner.

10. A process for forming an inside corner on supporting structure from a pair of panels of drywall, the drywall having forward and rearward surfaces, using a corner device composed of a first large corner having a pair of relatively wide walls connected at right angles at a juncture and facing in one direction, and of a second small corner composed of a pair of relatively narrow walls connected to each other joined to the first large corner to form a cubicle parallelepiped with outwardly extending sides having forwardly and rearwardly disposed surfaces, said process comprising:
   applying adhesive to at least one of the edges of the panel where the corner is being formed and the exterior narrow walls of the second small corner;
   applying adhesive to at least one of the forwardly disposed surfaces of the outwardly extending sides of the corner device and the rearward surface of the panel;
   pressing the panels of drywall against exterior narrow walls of the second small corner and the outwardly extending sides of the corner device to adhere the panels to the corner device;
   applying adhesive to at least one of the support structures, and both the rearwardly disposed surfaces of the corner device and the rearward surfaces of the panels; and
   pressing the rearward surfaces of the combined panels and the rearwardly disposed surfaces of the corner device against the supporting structure to form the inside corner on the supporting structure.

11. A corner device for connecting a pair of drywall panels having a predetermined thickness at an inside corner of a structure, said corner device comprising:
   a pair of relatively planar wider walls disposed in planes intersecting at a transverse angle to each other along a first line;

a pair of relatively planar narrow walls disposed in planes intersecting at a transverse angle identical to the angle of intersection of the planes of said wide planar walls along a second line parallel to the first line and forming a small corner;

said wide planar walls respectively intersecting said narrow planar walls and terminating at the respective lines of intersection, said lines of intersection being parallel to said first and second lines;

said planar narrow walls each having a dimension perpendicular to said second line and to the respective lines of intersection, said dimension being no greater than the predetermined thickness of said drywall panels;

said corner device being attachable to the walls defining the inside corner of the structure, said relatively wide planar walls being attachable to the structure with said small corner facing the inside corner of the structure, and said drywall panels being respectively attachable to relatively wide walls and their edges abutting the respective narrow planar walls to form an inside drywall corner on the inside corner of the structure.

* * * * *